(12) United States Patent
Khawas et al.

(10) Patent No.: US 11,741,380 B2
(45) Date of Patent: Aug. 29, 2023

(54) MACHINE LEARNING PREDICTIONS FOR DATABASE MIGRATIONS

(71) Applicant: Oracle International Corporation, Redwood Shores, CA (US)

(72) Inventors: Malay K. Khawas, Kolkata (IN); Saumika Sarangi, Bhubaneswar (IN); Sudipto Basu, Bangalore (IN); Ranajoy Bose, Bangalore (IN); Padma Priya Rajan Natarajan, Bangalore (IN); Bogapurapu L. K. Rao, Bangalore (IN); Parul Yamini, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 690 days.

(21) Appl. No.: 16/778,370

(22) Filed: Jan. 31, 2020

(65) Prior Publication Data

US 2021/0241131 A1 Aug. 5, 2021

(51) Int. Cl.
*G06F 16/21* (2019.01)
*G06N 5/04* (2023.01)
*G06N 20/20* (2019.01)

(52) U.S. Cl.
CPC ........... *G06N 5/04* (2013.01); *G06F 16/214* (2019.01); *G06N 20/20* (2019.01)

(58) Field of Classification Search
CPC .................................................. G06F 16/214
See application file for complete search history.

(56) References Cited

U.S. PATENT DOCUMENTS

2010/0161666 A1* 6/2010 Do .................. G06F 16/258
707/E17.022
2010/0293412 A1* 11/2010 Sakaguchi .......... G06F 11/0715
711/E12.001

(Continued)

FOREIGN PATENT DOCUMENTS

WO 2016094330 A2 6/2016
WO 2020005670 A1 1/2020

OTHER PUBLICATIONS

Chatterjee, "Taking a machine-first approach to cloud migration", Global Head, Cloud Applications, Feb. 25, 2019; https://sites.tcs.com/bts/cio-machine-first-approach-cloud-migration-article/.

(Continued)

*Primary Examiner* — Cam Y T Truong
(74) *Attorney, Agent, or Firm* — Potomac Law Group, PLLC

(57) ABSTRACT

Embodiments generate machine learning predictions for database migrations. For example, a trained machine learning model that has been trained using training data can be stored, where the training data includes migration information for database migrations and migration methods for the database migrations, and the training data migration information includes a source database type and a target database infrastructure. Migration information can be received for a candidate database migration that includes a source database type and a target database infrastructure. Using the trained machine learning model, migration methods based on the migration information for the candidate database migration can be predicted.

20 Claims, 6 Drawing Sheets

(56) References Cited

U.S. PATENT DOCUMENTS

| | | | |
|---|---|---|---|
| 2012/0089548 A1* | 4/2012 | Kobayashi | G06F 3/0605 706/46 |
| 2013/0085742 A1 | 4/2013 | Barker et al. | |
| 2014/0115162 A1* | 4/2014 | Kalyanaraman | H04L 45/72 709/226 |
| 2015/0019197 A1 | 1/2015 | Higginson et al. | |
| 2015/0363396 A1 | 12/2015 | Sengupta et al. | |
| 2016/0142261 A1 | 5/2016 | Huang et al. | |
| 2018/0074748 A1 | 3/2018 | Makin et al. | |
| 2018/0343300 A1 | 11/2018 | Halter et al. | |
| 2019/0108223 A1* | 4/2019 | Fabijancic | G06F 8/30 |
| 2020/0026538 A1* | 1/2020 | Cui | G06N 3/02 |
| 2021/0097367 A1* | 4/2021 | Zhang | G06N 3/084 |
| 2021/0192496 A1* | 6/2021 | Gregovic | G06N 20/20 |

OTHER PUBLICATIONS

Unknown, "Cloud premigration services from IBM", IBM cloud Data sheet, https://www.IBM.com/downloads/cas/D79QLRJE, Dec. 2016.

Unknown, AWS Database Migration Service, https://aws.amazon.com/dms/?nc=bc&pg=sct, last downloaded on Jul. 30, 2019.

Unknown, Azure migration center, "Start your cloud migration process", https://azure.microsoft.com/en-in/migration/migration-journey/, last downloaded Jul. 29, 2019.

Unknown, InCycle Software, "Data & Artificial Intelligence Cognitive Service", https://www.incyclesoftware.com/azure-data-and-ai, last downloaded Jul. 30, 2019.

Unknown, SAP HANA, "Database Migration", https://www.sap.com/india/products/hana/implementation/migration.html, last downloaded Jul. 29, 2019.

International Search Report and Written Opinion issued in the International Application No. PCT/US2020/032318, dated Sep. 22, 20202.

* cited by examiner

MACHINE LEARNING PREDICTIONS FOR DATABASE MIGRATIONS

FIELD

The embodiments of the present disclosure generally relate to machine learning predictions for database migrations.

BACKGROUND

The proliferation of computing and connected devices has generated vast amounts of data that requires management. As data grows in size, the technological challenges related to efficiently managing the data has become increasingly complex. For example, data migration from one implementation to the next, such as from an on-premise implementation to a cloud-based implementation, often relies on knowledge from experts. In addition, given organizational reliance of data services, requirements for database availability during migration can be difficult to meet. Accordingly, efficient database migration techniques can improve data management systems.

SUMMARY

The embodiments of the present disclosure are generally directed to systems and methods for generating machine learning predictions for database migrations. A trained machine learning model that has been trained using training data can be stored, where the training data includes migration information for database migrations and migration methods for the database migrations, and the training data migration information includes a source database type and a target database infrastructure. Migration information can be received for a candidate database migration that includes a source database type and a target database infrastructure. Using the trained machine learning model, migration methods based on the migration information for the candidate database migration can be predicted.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Embodiments predict migration techniques for database migrations using a trained machine learning model. For example, database migrations, such as migrations from on-premise computing devices to a cloud computing system, can be implemented using a number of different techniques and combinations of techniques, such as database replication, cloning, pluggable database implementations, and other techniques. Based on the circumstances for a migration, such as source database implementation/type, target database infrastructure, downtime criteria, bandwidth criteria, and other circumstances, some of these database migration techniques can be more effective than others. For example, often an expert may select the migration techniques based on experience.

Embodiments use a trained machine learning model to predict database migration techniques based on the circumstances for a given migration. For example, training data can include information for database migrations and techniques used to implement the migrations (e.g., techniques considered successful given the circumstances for the migrations). This training data can be used to train the machine learning model, where the training can configure the model to learn trends in the data. As such, the trained model can be effective at predicting migration techniques that will be effective given a set of circumstances for a database migration. In other words, a candidate database migration can be fed to the trained machine learning model, and predictions for migration techniques can be generated based on the learned trends within the training data.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
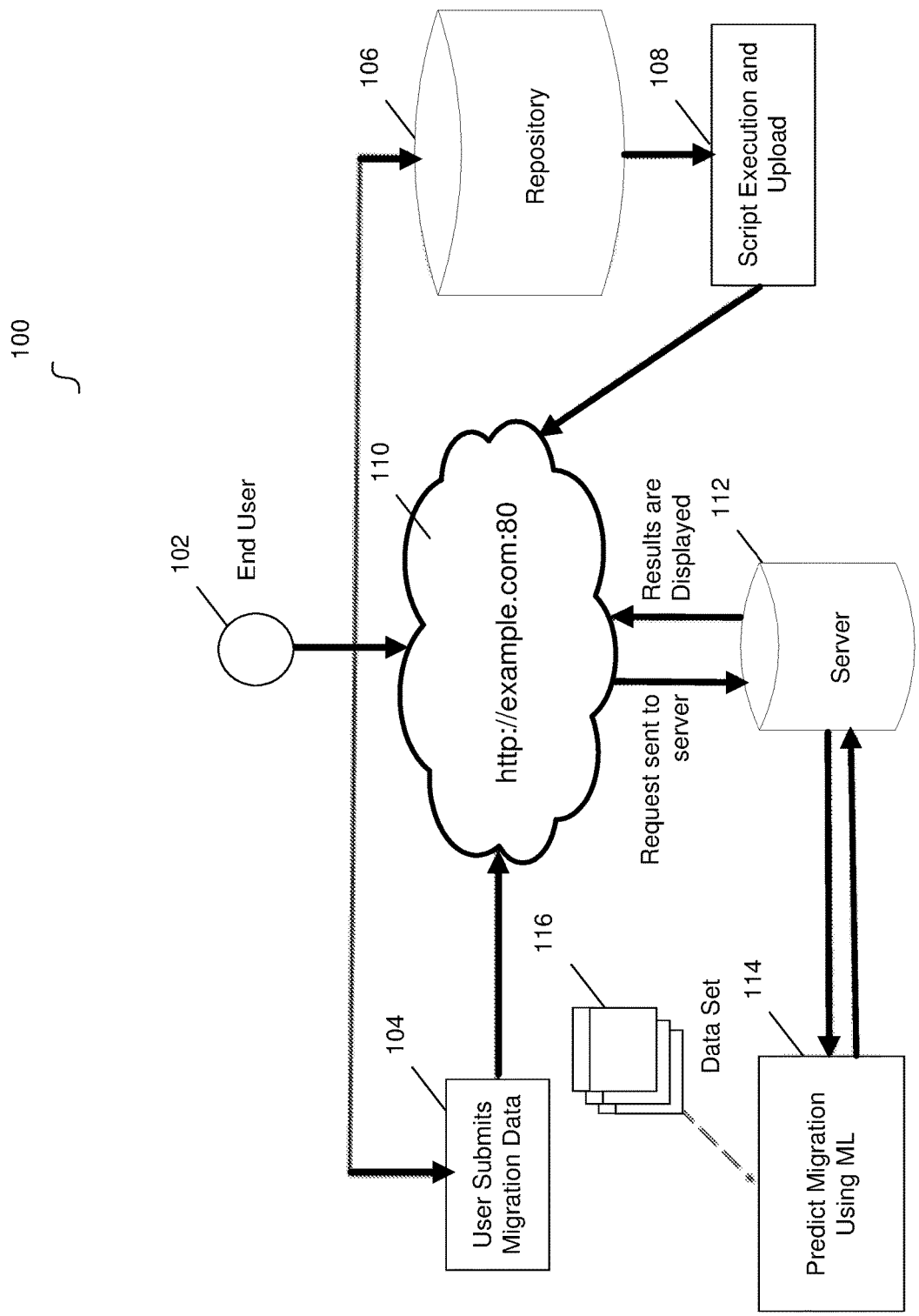
FIG. 1 illustrates a system for generating machine learning predictions for database migrations according to an example embodiment.

FIG. 1 illustrates a system for machine learning predictions for database migrations according to an example embodiment. System 100 includes user device 102, submission of migration information 104, repository 106, script execution and submission 108, cloud system 110, server 112, machine learning component 114, and data set 116. For example, system 100 can be used to predict migration techniques for migrating the source database to a target database. Migration information for migrating the source database to the target database can be submitted by the user (represented by submission of migration information 104) and/or can be automatically retrieved by a script and submitted (represented by script execution and submission 108). In some embodiments, user device 102 can be any suitable computing device that implements or is part of a system that implements a source database for migration.

In some embodiments, submission of migration information 104 can include manual entry of migration information (e.g., into a spreadsheet, web form, progressive web application, and the like) by the user. This submission can be communicated to cloud system 110. In some embodiments, script execution and submission 108 can include execution of a script (or any other form of code, such as executable code) that is configured to retrieve migration information from a source system/source database. For example, a script can be retrieved from repository 106 (e.g., Github, or any other repository) and executed on the source system/source database. The script can retrieve migration information about the source database and source system that implements the source database. Script execution and submission 108 can include generating a payload or document with the migration information and communicating it to cloud system 110.

In some embodiments, submission of migration information 104 can be implemented along with script execution and submission 108. For example, execution of the script can generate migration information about the source database and source system, however other migration information can be manually entered (e.g., target database infrastructure, bandwidth criteria, downtime criteria, and the like) or migration information generated by the script can be overwritten by manual entry. In some embodiments, the script can be configured to prompt a user for additional migration information. For example, script execution and submission 108 can include user prompting and manual entry of certain pieces of migration information (e.g., target database infrastructure, bandwidth criteria, downtime criteria, and the like). In this embodiment, the payload or document generated by the script and communicated to cloud system 110 includes the information retrieved about the source system/database and the additional migration information manually entered.

In some embodiments, cloud system 110 can submit a request to server 112. For example, the request can be for recommended or predicted migration techniques based on the included migration information (received at cloud system 110). In particular, the migration information is descriptive of the circumstances for a migration, and the request can be for migration technique predictions generated based on historic migration information (e.g., data set 116). In some embodiments, the migration information is translated to a machine readable format at cloud system 110, server 112, machine learning component 114, or at any other point in the flow (e.g., by client side code, a client script, the script executed to generate the migration information, or the like). For example, the translation can be machine readable data that represents the migration information as binary (e.g., 0s and 1s) or other suitable machine readable code, such as hexadecimal. The translation can be performed using a predetermined translation technique that converts the migration information to corresponding machine readable data.

In some embodiments, the migration information (e.g., in machine readable format, such as binary) is communicated to machine learning component 114. For example, using data set 116 (e.g., training data) machine learning model 114 can be trained to predict database migration techniques based on (given an input of) a set of migration information that represents the circumstances for a candidate database migration (e.g., features for the prediction). Machine learning model 114 can then predict migration techniques for the candidate database migration represented by the migration information. These predicted techniques can be communicated to server 112 and cloud system 110, which can display the results and/or implement one or more of the predicted migration techniques. In some embodiments, the predicted techniques can be communicated to user device 102, which can similarly display or implement one or more of the predicted techniques.

Figure 2:
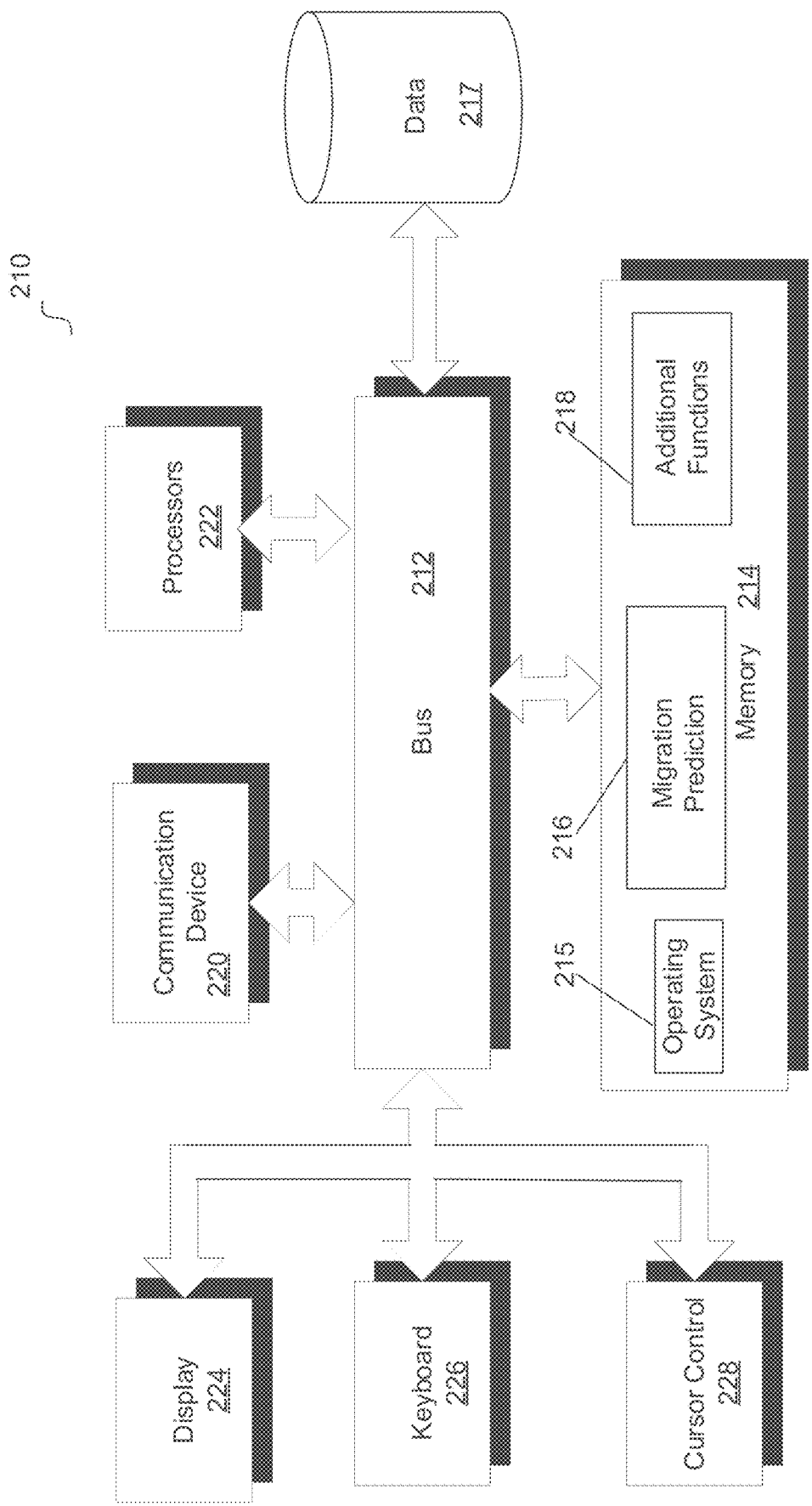
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, migration prediction component 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, migration prediction component 216, as well as other applications modules 218. Operating system 215 provides operating system functionality for system 210. Migration prediction component 216 may provide system functionality for predicting an database migration techniques, or may further provide any other functionality of this disclosure. In some instances, migration prediction component 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various modules of the Oracle® Enterprise Resource Planning ("ERP") Cloud, and/or engagement engine ("EE")

embedded in Oracle® Cloud, such as Oracle® Business Intelligence Enterprise Edition ("OBIEE"), Oracle® Data Integrator, for example. A database 217 is coupled to bus 212 to provide centralized storage for modules 216 and 218 and to store, for example, wireless device activity, and in some embodiments, user profiles, transactions history, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Figure 3:
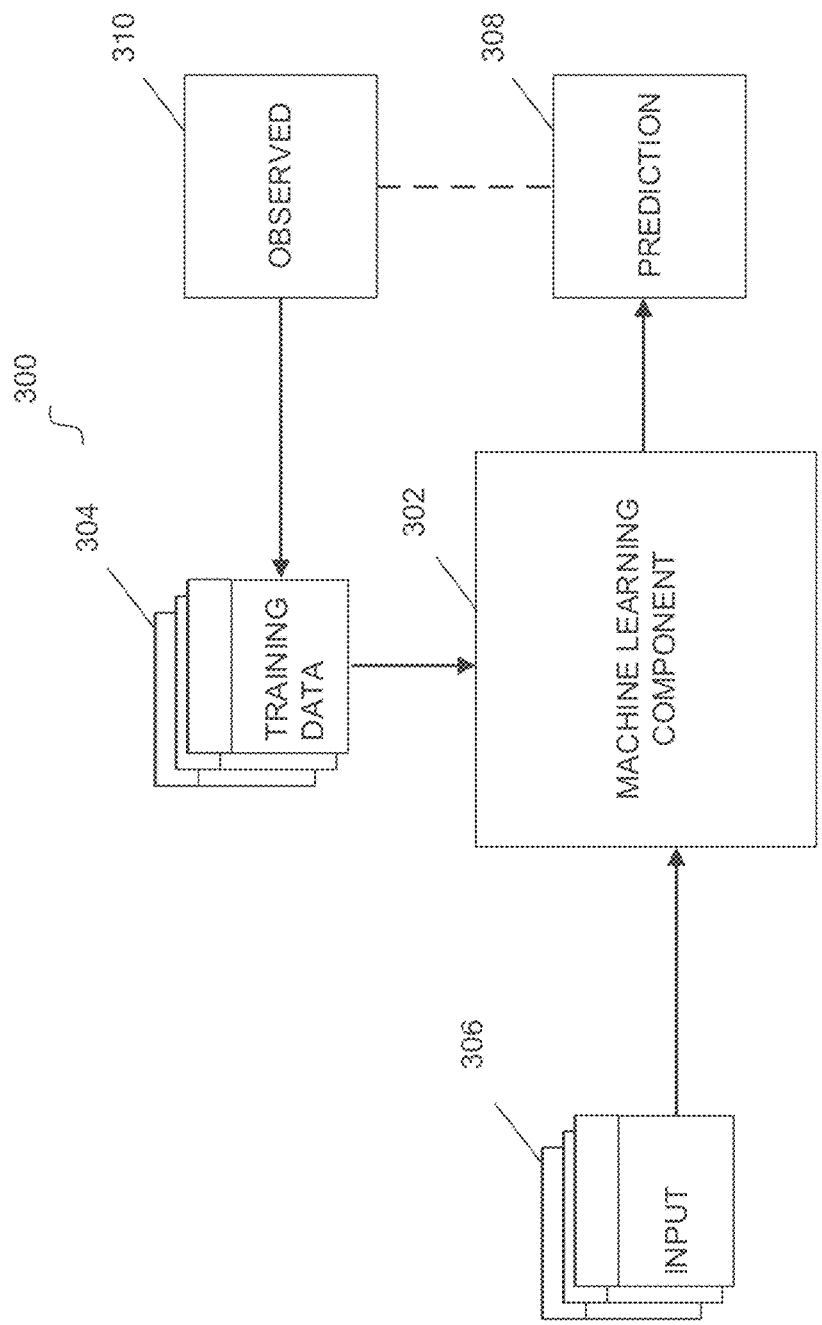
FIG. 3 illustrates a prediction system according to an example embodiment.

FIG. 3 illustrates a prediction system according to an example embodiment. System 300 includes machine learning component 302, training data 304, input data 306, prediction 308, and observed data 310. In some embodiments, machine learning component 302 can be a designed model that includes one or more machine learning elements (e.g., a neural network, support vector machine, Bayesian network, random forest classifier, gradient boosting classifier, and the like). Training data 304 can be any set of data capable of training machine learning component 302 (e.g., a set of features with corresponding labels, such as labeled data for supervised learning). In some embodiments, training data 304 can be used to train machine learning component 302 to generate a trained machine learning model.

In some embodiments, machine learning model 114 of FIG. 1 can be similar to machine learning component 302 of FIG. 3 and dataset 116 of FIG. 1 can be similar to training data 304 of FIG. 3. For example, a trained machine learning model may be configured to predict migration techniques for a source to target database migration. In some embodiments, training data 304 can include instances of migration information (e.g., individual instances of migration information for a migration) and corresponding labels that include the migration techniques used to perform the migrations (e.g., migration techniques for the individual instances of migration information). Accordingly, prediction 308 generated by machine learning component 302 trained by embodiments of training data 304 for a given candidate database migration can be one or more migration techniques (e.g., cloning, replication, disaster recovery switchover, pluggable databases, and the like).

In some embodiments, the predicted migration techniques (or a portion of the predicted techniques) can be used to perform the candidate database migration. Upon implementing the database migration, the effectiveness of the predicted migration techniques can be determined, such as the compliance with downtime criteria, bandwidth criteria, timing criteria, and the like. Feedback about the predicted migration techniques can be retrieved (e.g., represented in FIG. 3 as observed data 310), and this feedback can be processed to update training data 304.

The design of machine learning component 302 can include any suitable machine learning model components (e.g., a neural network, support vector machine, specialized regression model, random forest classifier, gradient boosting classifier, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type. In some embodiments, the neural network can be configured for deep learning, for example based on the number of hidden layers implemented. In some examples, a Bayesian network can be similarly implemented, or other types of supervised learning models.

For example, a support vector machine can be implemented, in some instances along with one or more kernels (e.g., gaussian kernel, linear kernel, and the like). In some embodiments, a k-nearest neighbor ("KNN") algorithm can be implemented. For example, a KNN algorithm can determine a distance between a candidate database migration (e.g., represented by input 306) and the instances of training data 304, and one or more "nearest neighbors" relative to this distance can be determined (the number of neighbors can be based on a value selected for K). Prediction 308 can then be generated based on the distances from these "nearest neighbor" instances.

In some embodiments, machine learning component 302 can include an ensemble learning model. For example, machine learning component 302 can include a random forest classifier that includes multiple machine learning components whose predictions are combined. Implementations of the random forest classifier include decision trees that are trained by training data 304 (e.g., using subsets of the training data per tree). The random forest algorithm can then aggregate votes from these decision trees to arrive at a prediction.

In some embodiments, machine learning model 302 can include a gradient boosting learning algorithm, such as XGBoost. The gradient boosting algorithm can similarly leverage an ensemble learning technique with multiple decision trees trained using training data 304, however the gradient boosting algorithm can align decision trees in sequence. In this implementation, a tree later in the sequence learns to "correct" errors from predictions generated by earlier decision trees. The gradient boosting learning algorithm aggregates predictions generated by the individual decision trees to generate prediction 308. Individual decision trees can be trained using a recursive splitting algorithm that splits nodes of the tree (e.g., recursive binary splitting), or any other suitable training technique.

In some embodiments, machine learning component 302 can be multiple models stacked, for example with the output of a first model feeding into the input of a second model. Some implementations can include a number of layers of prediction models. In some embodiments, features of machine learning component 302 can also be determined. For example, feature engineering can be used to generate a set of features implemented by one or more machine learning models.

In some embodiments, the design of machine learning component 302 can be tuned during training, retraining, and/or updated training. For example, tuning can include adjusting a number of hidden layers in a neural network, adjusting a kernel calculation used to implement a support vector machine, and the like. This tuning can also include adjusting/selecting features used by the machine learning model. Embodiments include implementing various tuning configurations (e.g., different versions of the machine learning model and features) while training in order to arrive at a configuration for machine learning component 302 that, when trained, achieves desired performance (e.g., performs predictions at a desired level of accuracy, run according to desired resource utilization/time metrics, and the like).

In some embodiments, retraining and updating the training of the machine learning model can include training the model with updated training data. For example, the training data can be updated to incorporate observed data, or data that has otherwise been labeled (e.g., for use with supervised learning).

In some embodiments, machine learning component 302 can include an unsupervised learning component. For example, one or more clustering algorithms, such as hierarchical clustering, k-means clustering, and the like, or unsupervised neural networks, such as an unsupervised autoencoder, can be implemented. In this example, database migration information and migration techniques (corresponding to the circumstances represented by the migration information) can be input to the unsupervised learning component to learn aspects of the data, such as clusters that relate features to migration techniques. Based on the learned relationships, predictions 308 that represent migration techniques for a candidate database migration can be generated (e.g., based on input 306 that includes features representative of the candidate database migration).

Embodiments predict migration techniques based on migration circumstances, such as network bandwidth, downtime consideration, and target database. Machine learning capabilities enable embodiments to continuously learn from actual migration experience to fine tune prediction. In many conventional implementations, a database migration journey involves dependency on experienced database experts that arrive on migration techniques (for instance based on their experience with other migrations). Accordingly, database migrations that cannot rely on a group of experienced database experts often struggle with efficient migration.

Moreover, migration options for databases are often numerous in nature, and an understanding of the technologies at issue in a particular migration scenario can often be necessary. For example, an information technology team may need to be gathered to understand the current footprint of each database, collate complete information, and then decide what would be a feasible migration path based on experience. In many cases, a significant gap between how database migration has been planned vs actual experience is observed. These gaps place migration projects at undue risk and diminish the confidence of organizations to move production workloads to the cloud.

Embodiments solve a number of these migration scenario problems by implementing a methodical approach in developing a holistic migration predictor that continuously learns and evolves as the technology landscape changes. In some embodiments, machine learning components can be trained to learn from the vast experience of database experts. For example, a collective expertise of a selected batch of experienced database experts can be collated to generate a data set/data sheet, which can combine migration scenarios and associated migration technologies to arrive at efficient solutions. Subsequently, this data set can be updated based on observed migration experiences and provided feedback using machine learning models, which can ingest actual migration results and derive intelligence from those results.

In some embodiments, source database details, migration information, and a machine learning model can be used to predict an efficient migration path based on data sets created from the input of experienced database experts from real-time migrations. For example, embodiments can include retrieving migration information, predicting migration techniques using a trained machine learning model, and collecting feedback to optimize the machine learning model.

Referring back to FIG. 1, migration information for migrating a source database to a target database can be submitted by the user (represented by submission of migration information 104) and/or can be automatically retrieved by a script and submitted (represented by script execution and submission 108). Example migration information can include:

Source DB Version—Database Version of the Source DB system

Platform—Endian Format, Large or small, or other platform family

OS Platform—32 or 64 bit, OS platform (e.g. Linux) or other operation system information Multi-tenant Compartment—whether source DB is CDB enabled, 12c or above, and the like NLS Compatibility—Whether source and target have same national language support ("NLS")

DB Size—Source Database Size in GB
   Example database sizes:
   Small DBs [SDB] (Less than 500 G)
   Medium DBs [MDB] (500 G to 2 TB in Size)
   Large DBs [LDB] (2 TB to 10 TB)
   VLDBs [VLDB] (Larger than 10 TB)

Network/Bandwidth—Network Bandwidth available for transfer of data between source and target.

Target DB Infra—Target Cloud Infrastructure where the DB will be run
   Example options: IaaS, PaaS/Exacs Target DB Version—Version of the database on Target platform (same/upgraded version)

Permissible Downtime—total Downtime that is allowed for the Migration
   Permissible downtime can be categorized into following:
   Low Down Time [LDT] (10 Mins to 3 Hours)
   Medium Down Time [HDT] (3 Hours to 24 Hours)
   Downtime Not a Constraint [DNC]

In some embodiments, migration information for a candidate database migration can be obtained via the user and/or by a configured script. For example, migration information can be obtained via submission of migration information 104 and/or script execution and submission 108 of FIG. 1. In some embodiments, submission of migration information 104 can include manual entry of migration information (e.g., into a spreadsheet, web form, progressive web application, and the like) by the user, such as the example migration information disclosed. For example, a user can access a webpage (e.g., implemented by cloud system 100) and provide the migration information in web forms. In another example, a user can populate a document (e.g., spreadsheet, formatted data document, and the like) and upload the document, for example to cloud system 100.

In some embodiments, script execution and submission 108 can include execution of a script (or any other form of code, such as executable code) that is configured to retrieve migration information from a source system/source database. For example, a script can be retrieved from repository 106 (e.g., Github, or any other repository) and executed on the source system/source database. The script can retrieve migration information about the source database and source system that implements the source database. For example, the above migration information that relates to the source database or source environment (e.g., source database version, platform, OS platform, multi-tenant compartment, source database size(s), and the like) can be obtained from the source database and source system via execution of a script configured to retrieve such information. Script execution and submission 108 can include generating a payload or document with the migration information and communicating it to cloud system 110 (e.g., uploading).

In some embodiments, repository 106 can provide a service (e.g., for downloading code or scripts). For example, repository 106 can be Github and the script can be downloaded from a uniform resource locator ("URL") hosted by the repository. The downloaded script can then be communicated to the source servers/machines/systems to be evaluated. In other words, the script can be communicated to the components of the source whose interrogation provides the migration information relevant to the candidate database migration (e.g., machine that hosts the source database). In some embodiments, the script can be executed as admin and/or database owner. The script can generate an output file with the relevant migration information. For example, the output file can include source system and database migration information, target migration information, migration criteria (e.g., downtime, bandwidth, timing), and the like. In some embodiments, the output file can be a binary format file. The output file can then be communicated to the relevant source side systems/computing devices, which can then upload the output file to cloud system 100.

In some embodiments, submission of migration information 104 can be implemented along with script execution and submission 108. For example, execution of the script can generate migration information about the source database and source system (as disclosed herein), however other migration information can be manually entered (e.g., target database infrastructure, bandwidth criteria, downtime criteria, and the like) or migration information generated by the script can be overwritten by manual entry. In some embodiments, the script can be configured to prompt a user for additional migration information. For example, script execution and submission 108 can include user prompting and manual entry of certain pieces of migration information (e.g., target database infrastructure, bandwidth criteria, downtime criteria, and the like). In this embodiment, the payload or document generated by the script and communicated to cloud system 110 includes the information retrieved about the source system/database and the additional migration information manually entered.

In some embodiments, the migration information can be translated to a machine readable format. For example, migration information can be translated from a first format (e.g., human readable format, or alphanumeric) to a machine readable format (e.g., binary, decimal, hexadecimal, and the like) at cloud system 110, server 112, machine learning component 114, or at any other point in the flow (e.g., by client side code, a client script, the script executed to generate the migration information, or the like). In some embodiments, the machine readable format can be machine readable data that represents the migration information as 0s and 1s (or other suitable symbols consistent with decimal, hexadecimal, or other machine readable formats), where the translation can be performed by using a predetermined translation technique that converts the migration information to corresponding machine readable data.

For example, the data values present for the migration information can be assigned to predetermined binary (or other format) values. In some embodiments, each element (e.g., column) of migration information can have a closed set of predetermined values. For example, OS Platform can take values from a closed list of potential source operating system platforms, CDB can have the values CDB or non-CDB, NLS compatible can have the values Yes or NO, permissible down time can take values from a closed list of down times (e.g., low, medium, not a constraint), network bandwidth can take values from a closed list of network bandwidths, and the like.

In some embodiments, the closed lists enable a predetermined correspondence between a data value for a piece of migration information and a machine readable value (e.g., binary value). For example, where down time has a closed list of three values (e.g., low, medium, not a constraint), the predetermined binary mappings for these values can below down time to 010, medium down time to 001, and down time not a constraint to 100. In another example, the number of operating system platforms in the closed list can be 20, and each of these distinct data values in the closed list can map to a binary value.

In some embodiments, the closed list of data values for a piece of migration information (e.g., column) can be processed such that the data values are assigned to binary values in lexicographic order. In some embodiments, each piece of migration information can be filtered according to various techniques, hence a mapping for each piece of migration information in a lexicographic order can be created based on the processed/filtered data. In some embodiments, the mapping can create a definitive machine readable value for each column value. Within a given implementation, this mapping can be fixed, thus enabling input values to be translated and fed into the machine learning model to generate the correct output. Other suitable mappings can be implemented. Accordingly, the closed list of data values for the pieces of migration information (e.g., columns) enables translation to a simplified form of the migration information, such as a machine readable version that is conducive to machine learning.

In some embodiments, the closed lists for pieces of migration information are extensible. For example, where new data values become available or actionable for a piece of migration information (e.g., column) the closed list of values for that piece of information can be extended. Thus, a new value can be added to the closed list, creating a new implementation. In some embodiments, a plurality of new data values can generate the need to add one or more digits to a machine readable numeric value that represents the distinct data values of a piece of migration information. For a simplified example, a piece of migration information may previously only use two distinct data values, which can be coded by a single binary digit (e.g., 0 and 1) and adding one or more new values will require the addition of a digit to the binary data value (e.g., two binary digits, which can represent four values). In some embodiments, a new implementation based on changes to the possible data values for pieces of migration information may prompt changes to the machine learning model and/or training data, such as new mappings between training data values (e.g., alphanumeric values) and machine readable values (e.g., binary values), re-training or updating training of the model, changes to model architecture, and the like.

In some embodiments, the machine readable format (e.g., binary) of the migration information can then be fed to machine learning model 114, and migration technique predictions can be generated based on the migration circumstances represented by the machine readable migration information. For example, machine learning model 114 can be trained using dataset 116, which can include sets of migration information (e.g., features of the training data) and corresponding migration techniques (e.g., labels of the training data). In some embodiments, dataset 116 can include the same pieces of information (e.g., columns) as the migration information examples disclosed herein (e.g., Source DB Version, Platform, OS Platform, Source, DB Size, Target DB infra, Permissible Downtime, and the like). In some embodiments, dataset 116 can also include the same closed list of possible data values for each column. Dataset 116 can be used to train machine learning model 114 based on the labels within the dataset, or the migration techniques used to successfully accomplish the migration.

Accordingly, machine learning model 114 can learn trends within dataset 116 that associate migration information (representing the circumstances for a migration) to migration techniques. In some embodiments, predicted migration techniques can be generated for a candidate database migration based on the migration information (for the candidate database migration) that is provided to machine learning model 114.

In some embodiments, dataset 116 can represent training data used to train machine learning model 114, and the dataset can be processed into a machine readable format (similar to the translation techniques used to translate the migration information disclosed herein). For example, a machine learning model can generate predictions for input data when training data used to train the machine learning model is similar to the input data. Accordingly, when machine learning model 114 is configured and/or trained to generate predictions for a machine readable version of the migration information, the machine learning model has been previously trained using a machine readable version of dataset 116 (or an unsupervised model leverages a machine readable version of dataset 116).

In some embodiments, the data values present for the pieces of information in dataset 116 can be assigned to predetermined binary (or other format) values. In some embodiments, each element (e.g., column) of dataset 116 can have a closed set of predetermined values, similar to the migration information. For example, OS Platform can take values from a closed list of potential source operating system platforms, CDB can have the values CDB or non-CDB, NLS compatible can have the values Yes or NO, permissible down time can take values from a closed list of down times (e.g., low, medium, not a constraint), network bandwidth can take values from a closed list of network bandwidths, and the like.

In some embodiments, the closed lists enable a predetermined correspondence between a data value for a column of dataset 116 and a machine readable value (e.g., binary value), as described above with reference to processing migration information. In some embodiments, the mapping between data values for migration information to machine readable format and the data values within data set 116 to machine readable format are consistent, and thus a prediction generated based on migration information (as input) can be accurate. For example, predictions that leverage learned trend within dataset 116 can be generated when the translated machine readable data values of migration information input into machine learning model 114 are consistent with the translated machine readable data values of dataset 116. In some embodiments, changes to the mappings are implemented for both translating the migration information and translating dataset 116 to maintain consistency. For example, changes to the mappings can prompt changes to the format of dataset 116, at least because the representative data values may change, the closed list of data values for a particular column of dataset 116 may be extended, and the like. In some embodiments, machine learning model 114 can be trained, re-trained, or an updated to training can be performed based on changes to dataset 116.

Machine learning can be leveraged to analyze massive quantities of data. However, time, resources, and knowhow are often required to properly train machine learning models. Embodiments predict migration techniques based on migration information for a candidate database migration (e.g., the circumstances for the candidate database migration), such as source database information, target infrastructure, platform, database size, and the like. This can be viewed as a classification problem, such as classifying an email as either 'spam or not spam', and thus classification machine learning algorithms can be leveraged to accomplish the prediction. Embodiments leverage machine learning algorithms where multiple features can be used to accomplish prediction of a target value or set of values (e.g., migration techniques).

For example, embodiments of machine learning model 114 include one or more learning algorithms. With reference to FIG. 3, machine learning model 114 can include machine learning component 302. In some embodiments, machine learning model 114 implements a random forest classifier. A random forest classifier algorithm is an example of ensemble learning. Ensemble algorithms are those which combine more than one algorithm of the same or a different kind, for example to predict classifications. Because ensemble learning is based on multiple algorithms, often the predictions results can achieve improved variance (hence overfitting can be avoided). Overfitting can occur when a model learns the detail and noise in a set of training data to the extent that it negatively impacts the performance of the model on new data. In other words, a trained model that suffers from overfitting does not generalize well on new data, or data that has not been used to train the model. Since often a machine learning model is expected to perform well on new data, overfitting can reduce the practical benefits of machine prediction.

An example random forest classifier can create a set of decision trees from subsets of training data (e.g. randomly selected subsets). The algorithm can then aggregate predictions, or votes, from different decision trees to arrive at a final prediction. For example, suppose a training set is given with features [X1, X2, X3, X4]. A random forest algorithm may create three decision trees taking input from subsets of these features, for example:
  1. [X1, X2, X3]
  2. [X1, X2, X4]
  3. [X2, X3, X4]

In this example, each tree uses three features from the four features available in the training data. However, training data features are often numerous, and in some implementations each tree uses a small number of features relative to the features available in the training data (e.g., 50%, 25%, 10%, 5%, and the like). In addition, when training the three decision trees, instances of training data can also be randomly selected. For example, "m" instances of training data may be available in the dataset (each with a label used for accuracy calculation/node splitting), and each tree can use "k" instances for training, where k<m (in some instances k<<m).

The algorithm can then arrive at a prediction based on an aggregation technique, such as using the majority vote from each of the decision trees. The parameters of a random forest classifier can be total number of decision trees, decision tree related parameters (e.g., number of features for a tree, number of leaves to split a decision tree node, and the like), aggregation technique (e.g., majority, average, and the like), and other suitable parameters.

In some embodiments, machine learning model 114 implements a gradient boosting learning algorithm, such as XGBoost. Gradient boosting, such as the gradient boosting decision tree algorithm, is an ensemble approach to learning. Similar to a random forest algorithm, gradient boosting leverages multiple decision trees, however the trees are built sequentially such that each subsequent tree aims to reduce the errors of the previous tree. For example, each tree can learn from its predecessors, thus the tree that grows next in the sequence will learn from an updated version of the residuals (or errors). The base learners (e.g., individual trees in the sequence) are often weak learners in which the bias is high, however these weak learners contribute information for downstream prediction. Accordingly, gradient boosting algorithms such as XGBoost can achieve a strong learning model by effectively combining weak learners. For example, the final strong learner reduces both the bias and the variance experienced by the individual week learner trees.

In some embodiments, machine learning model 114 implements a logistic regression. Logistic regression, also known as logit regression or logit model, is a mathematical model used in statistics to estimate the probability of an event occurring having been given some previous data. Logistic regression works with binary data, where either the event happens (1) or the event does not happen (0). Logistic regression is a linear algorithm.

In some embodiments, machine learning model 114 implements a neural network. For example, a neural network can be trained using dataset 116 (including labels for instances of training data). Based on a calculated loss, a gradient can be propagated through the neural network to calculate weights for the neurons within the neural network. Once trained, the weights of the neurons can be used to generate predictions given a set of input features (e.g., the machine readable version of the migration information).

In some embodiments, the translated machine readable data (e.g., translated training data and translated migration information, or input) used to accomplish prediction by machine learning model 114 can be configured to achieve improved results. For example, some machine learning models are data hungry, and thus require very large datasets to achieve accurate predictions. However, due to the complexity of database migrations, the high variance in combinations of migration techniques that can be used to accomplish the migrations, fast paced progression of migrations technologies, and several other factors, some embodiments of dataset 116 may be limited in size (e.g., instances or rows of training data). Accordingly, some embodiments of machine learning model 114 avoid deep learning architectures in favor of non-deep learning models.

In some embodiments, the translated machine readable data (e.g., translated training data and translated migration information, or input) can be configured to achieve successful prediction with the subset of machine learning models that are effective with limited datasets. For example, the closed list of data values per column, numeric representations, and consistency of the data values can make it easier for these machine learning models to detect trends in the limited dataset. Accordingly, the translation to the machine readable data format is tailored to the circumstance and the machine learning models used in some embodiments.

Embodiments predict migration techniques for a candidate database migration. Migration techniques can include migration methods, migration technologies, one or more database migration products that achieve a functionality for migration, and the like. In some embodiments, migration techniques can use functionality such as Oracle® Recovery Manager (RMAN) and Oracle® Data Guard.

RMAN is a tool integrated with the Oracle® Database that satisfies the demands of high performance, manageable backup, and recovery. RMAN is designed to provide block-level corruption detection during backup and restore. RMAN can optimize performance and space consumption during backup with file multiplexing and compression, and operates with backup software systems via the supplied Media Management Library (MML) API.

RMAN can bring rich functionality such as online backups, incremental backups, block media recovery, automation of backup management tasks, and integration with third party media management systems into the Data Guard configuration. RMAN and Data Guard together enable RMAN backups to be seamlessly offloaded to a physical standby database, allowing customers to gain more value out of their disaster recovery investment. Backups do not impact normal Data Guard operation as they can be taken while the standby database is in recovery or read-only mode. Backups can be used to recover either primary or standby database servers. Data Guard and RMAN together provide reliable and tightly integrated solution to achieve improved levels of database availability supporting applications with high availability demands. Data Guard and RMAN are both fully supported features of the Oracle® Database Enterprise Edition (RMAN is also provided with Oracle Database Standard Edition).

Accordingly, different migration techniques can leverage different software functionality, levels of computing resources, bandwidth, and the like. The mix of migration techniques utilized is based on the circumstances for the migration (represented by the migration information). Example migration techniques can include:

Recover Manager ("RMAN") Cross Platform Incremental Transportable Tablespace
  Recovery Manager (RMAN) is a database client that performs backup and recovery tasks on databases and automates administration of backup strategies. When leveraging RMAN Cross Platform Incremental Transportable Tablespace, RMAN converts the data being transported to a format (e.g., endian format) of the target platform.
  For example, in some implementations, the first step can be to copy a full backup from the source to the destination. Then, by using a series of incremental backups, each smaller than the last, the data at the destination system can be brought nearly current with the source system, minimizing downtime. For example, this procedure can experience down time during the final incremental backup, and the meta-data export/import.

Hybrid DataGuard from OnPremise to Cloud Infrastructure DBSystem
  Data Guard enables and automates the management of a disaster recovery solution, such as for Oracle® databases located on the same campus or across the continent. Data Guard can include a production database (also known as the primary database) and one or more standby database(s), which can be transactionally consistent copies of the production database.

Oracle® Golden Gate Real Time Replication

Oracle® GoldenGate is a comprehensive software package for real-time data integration and replication in heterogeneous environments. The product set enables high availability solutions, real-time data integration, transactional change data capture, data replication, transformations, and verification between operational and analytical enterprise systems.

RMAN Restore and Recovery from Full Backup

Oracle® Recovery Manager (RMAN) provides a comprehensive foundation for efficiently backing up and recovering a database. It is designed to provide block-level corruption detection during backup and restore. RMAN optimizes performance and space consumption during backup with file multiplexing and backup set compression, and integrates with Oracle® Secure Backup, as well as third party media management products.

RMAN Active Duplicate

Active database duplication can copy a live target database over the network to an auxiliary destination and then create a duplicate database. When compared to other migration techniques, one difference is that pre-existing RMAN backups and copies need not exist. The duplication work is performed by an auxiliary channel. This channel corresponds to a server session on the auxiliary instance on the auxiliary host.

MV2OCI: Move Data to Oracle Cloud Database in "One-Click"

Move to Autonomous Database (MV2ADB) is a tool that loads data from "on premises" databases to an Autonomous Database Cloud, for example leveraging an Oracle® Data Pump. Data Pump Import can import data from Data Pump files, for example residing on the Oracle® Cloud Infrastructure Object Storage. In some implementations, data can be saved to a Cloud Object Store and loaded to Autonomous Database Cloud using "mv2adb".

Unplugging and Plugging a Physical Database ("PDB")

An unplug/plug migration can be used to migrate a PDB database (e.g., Oracle® Database 12c PDB) to a PDB database (e.g., in an Oracle® Database 12c database on a database service database deployment). This migration technique can be used when the on-premises database and the Oracle® Cloud Infrastructure Database service database have compatible database character sets and national character sets.

Unplugging and Plugging a Non-Container Database ("Non-CDB")

An unplug/plug migration can be used to migrate a non-CDB database (e.g., Oracle® Database 12c non-CDB database) to a PDB database (e.g., in an Oracle® Database 12c database on a database service database deployment). This migration technique can be used when the on-premises database and the Oracle® Cloud Infrastructure Database service database have compatible database character sets and national character sets.

Remote Clone Physical Database ("PDB")

This remote cloning migration technique can be used to copy a PDB from an on-premises Database (e.g., Oracle® 12c database) to a PDB (e.g., in an Oracle® Database 12c database on the database service). This migration technique can be used when the database service databases have compatible database character sets and national character sets.

Zero Downtime ("ZDM") Utility

Zero Downtime Migration can be used to migrate database with minimal downtime. For example, the utility can migration on-premises databases and Oracle® Cloud Infrastructure Classic instances to Oracle® Cloud Infrastructure, Exadata Cloud at Customer, and Exadata Cloud Service without incurring significant downtime, for example by leveraging technologies such as Oracle® Active Data Guard.

Zero Downtime Migration can use mechanisms such as backing up the source database to Oracle® Cloud Infrastructure Object Storage, creating a standby database (with Oracle® Data Guard Maximum Performance protection mode and asynchronous (ASYNC) redo transport mode) in the target environment from the backup, synchronizing the source and target databases, and switching over to the target database as the primary database.

Zero Downtime Migration can enable fallback capability after database migration is complete. Upon switchover, a target database (e.g., running in the Oracle® Cloud Infrastructure, Exadata Cloud at Customer, or Exadata Cloud Service) can become the primary database, and the on-premises can become the standby. Zero Downtime Migration can also support offline (backup and recovery) migration.

Remote Clone (NonCDB)

Remote Clone (nonCDB) can be used to copy a non-CDB database (e.g., an Oracle® Database 12c non-CDB on-premises database) to a PDB database (e.g., a PDB in an Oracle® Database 12c database on the Database service).

Remote Clone (nonCDB) can be used if the on-premises database and Database service database have compatible database character sets and national character sets.

Data Pump Conventional Export Import

Data Pump Conventional Export Import can be used to migrate an on-premises source database, tablespace, schema, or table to a database on a database service database deployment.

Data Pump Full Transportable

The Data Pump full transportable migration technique can copy an entire database from on-premises host to a database on a database service database deployment.

Data Pump Transportable Tablespace

The Transportable Tablespace migration technique is generally faster than a conventional export/import of the same data because the data files containing the actual data are simply copied to the destination location. Data Pump can be used to transfer the metadata of the tablespace objects to the new database.

The Transportable Tablespace migration technique can be used when the database character sets of the on-premises database and the Oracle® Cloud Infrastructure Database service database are compatible.

RMAN Active Duplicate for PDBs

Active database duplication can copy a live target database over the network to the auxiliary destination and then create a duplicate database. A difference from other migration techniques is that pre-existing RMAN backups and copies are not needed. The duplication work can be performed by an auxiliary channel. This channel corresponds to a server session on the auxiliary instance on the auxiliary host. A pluggable database can be duplicated using the RMAN DUPLICATE command and using the PLUGGABLE DATABASE clause.

RMAN Cross Platform Transportable PDB

RMAN Cross Platform Transportable PDB can be used when the database character sets of an on-premises database and the database service database are compatible.

RMAN Cross Platform Transportable Tablespace ("TTS") Backup Sets

RMAN Cross Platform Transportable Tablespace Backup Sets can be used when the database character sets of the on-premises database and the database service database are compatible and operating systems are compatible (e.g., on separate endian). For example, Oracle® Database 12c on-premises tablespaces can be migrated to an Oracle® Database 12c database on a database service deployment using the RMAN cross-platform transportable backup sets method.

RMAN Transportable Tablespace with Data Pump

RMAN Transportable Tablespace with Data Pump can be used when the database character sets of the on-premises database and the Database service database are compatible.

RMAN Transportable Tablespace with Data Pump can be used to eliminate placing the tablespaces in READ ONLY mode, as required by the Data Pump Transportable Tablespace migration technique. This migration technique can be used to migrate an on-premises source database to a database deployment on a database service.

RMAN Convert Transportable Tablespace with Data Pump

This migration technique is similar to the Data Pump Transportable Tablespace technique, with the addition of the RMAN CONVERT command to enable transport between different platforms (e.g., endian implementations). Query V$TRANSPORTABLE_PLATFORM can be used to determine if the on-premises database platform supports cross-platform tablespace transport and to determine the endian format of the platform.

Refreshable PDB Switchover

Refreshable PDB Switchover can be used to switch the roles of a source PDB and a refreshable PDB.

Database Configuration Assistant ("DBCA") PDB Clone

The Oracle® Multitenant architecture, represented by pluggable databases (PDBs) in a multitenant container database (CDB), is common for Oracle® Database deployments. DBCA PDB Clone is a Database Configuration Assistant (DBCA)-based functionality that enables GUI-based cloning of PDBs, for example to create multiple PDBs. PDB Clone can help with the mass creation of identical PDBs for test and development purposes.

Other suitable migration techniques can also be used. Various migration techniques may be suitable in certain migration circumstances, for example based on platforms for source and target, resource availability, downtime constraints, cost, and other factors. For example, use of a mix of these migration techniques may optimize migration by reducing cost, increasing resource efficiency, reducing overhead, complying with downtime constraints, and generally by providing a level of migration service that corresponds to the specific circumstances of a migration. Embodiments leverage the learned trends from the dataset of migrations (e.g., training data) to predict which migration techniques fit a particular candidate migration, and thus provide an optimized migration experience.

In some embodiments, the predicted migration methods can be used to accomplish the database migration. For example, databases can be copied, disaster recovery databases can be utilized for migration, tablespaces can be moved, any or many of the disclosed migration techniques can be implemented, and any other suitable migration technique can be implement to accomplish the database migration. In other words, the database migration from a source system to a target system can be physically accomplished using the predicted migration techniques in some embodiments.

Figure 4:
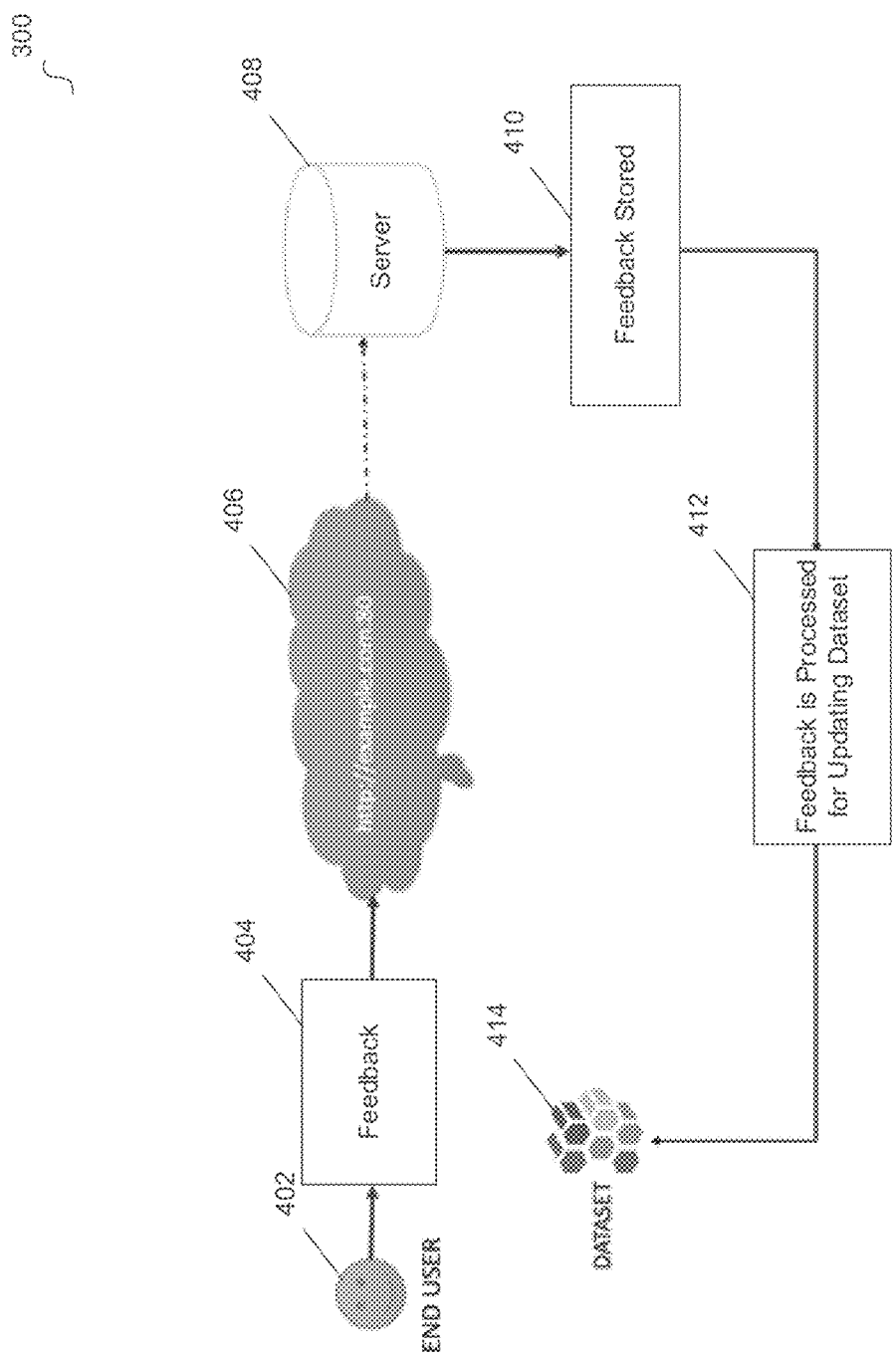
FIG. 4 illustrates a system for receiving feedback to improve a machine learning model according to an example embodiment.

In some embodiments, feedback about one or more of the predicted migration techniques (or generally feedback about execution of the candidate database migration) can be used to improve the effectiveness of the machine learning predictions. FIG. 4 illustrates a system for receiving feedback to improve a machine learning model according to an example embodiment. System 400 includes user device 402, feedback submission 404, cloud system 406, server 408, feedback storage 410, feedback processing 412, and dataset 414. For example, user device 402 can be used to provide feedback 404 to cloud system 406. In some embodiments, feedback can be provided about the execution of a database migration, for example by inputting information on a webpage (e.g., using a web form), inputting information on a progressive web application, uploading a document (e.g., spreadsheet or data document), or through other suitable means for providing feedback to cloud system 406.

In some embodiments, the feedback can include information about timing (e.g., migration time for a source database to target), downtime (e.g., amount of time database was unavailable), bandwidth (e.g., data usage), compliance with criteria (e.g., compliance with downtime criteria, bandwidth criteria, and the like), works hours (e.g., number of hours required to manually fix issues), and the like. In some embodiments, the migration information for a given database migration is provided with the feedback. For example, the feedback can reflect that the predicted migration techniques for the candidate database migration were implemented and report whether the constraints for the candidate database migration were met by the predicted migration techniques. In some embodiments, the feedback can indicate that the predicted migration techniques performed well from a timing and computing resource perspective, but were too costly for the circumstances of the migration. In some embodiments, the feedback may indicate that a predicted migration technique was substituted for another migration technique based on a human expert's analysis that the predicted migration technique would not perform well. In some embodiments, the feedback can be communicated to server 408. Feedback storage 410 can store feedback for various database migrations over time.

In some embodiments, the feedback stored can be processed (e.g., after meeting a criteria, such as a period of time or an amount of feedback received). Feedback processing 412 can include processing the feedback to generate instances of training data (e.g., rows) that include migration information for a given database migration and migration methods used to successfully execute the migration. In some embodiments, the feedback can be reviewed to determine whether the migration was successful, and thus whether an instance of training data should be added. For example, where a downtime criteria is not met by the performed migration, the feedback can be discarded rather than added to the training data. Feedback can indicate whether downtime criteria and other migration criteria are met (e.g., duration of time criteria, work hours criteria), and a migration can be deemed successful in some implementations when the feedback indicates the migration criteria has been met. In some embodiments, feedback about a migration that used migration techniques that did not meet criteria for the migration can be used to update the training data.

In some embodiments, dataset 414 can be updated with the processed feedback. For example, dataset 414 can include training data with instances of migration information and migration techniques used to perform the migration. Where feedback indicates successful migration (e.g., that met downtime criteria, timing criteria, work hours criteria), the feedback can be processed to generate an instance of training data and update dataset 414. In some embodiments, where feedback indicates that migration failed to meet certain migration criteria, dataset 414 can be pruned of similar instances of migration information and migration techniques. For example, a distance metric can be used to calculate a distance between the migration that failed to meet criteria and instances of training data, and one or more instances of training data that result in a distance metric below a threshold criteria can be pruned from dataset 414.

In some embodiments, feedback about migrations that failed to meet a criteria can be stored over time, and pruning dataset 414 can occur when a number of similar migrations indicate failure to meet a criteria. For example, a distance metric can indicate a similarity between migrations. Distance metrics can be calculated for the set of migrations where feedback was received that indicates failure to meet one or more migration criteria, and similar migrations can be discovered where distances calculated are below a threshold. When the number of similar migrations that failed to meet one or more criteria according to stored feedback exceeds a threshold number (or meets some other feedback criteria), dataset 414 can be pruned of similar migrations. In some embodiments, pruning includes removing some (not all) similar migrations from dataset 414.

Embodiments that incorporate feedback capture actual migration results to enhance the machine learning model used to predict migration techniques. This results in a continual learning process, which can ensure that the predicted migration techniques will continue to be successful over the long term. In other words, new migration techniques and migration criteria (e.g., constraints) can be incorporated and their effects calibrated in the algorithm. Embodiments that predict database migration techniques are flexible and robust, where new techniques, migration criteria, or migration information can be added over time, and successful predictions can continue to be generated under changing circumstances.

Figure 5:
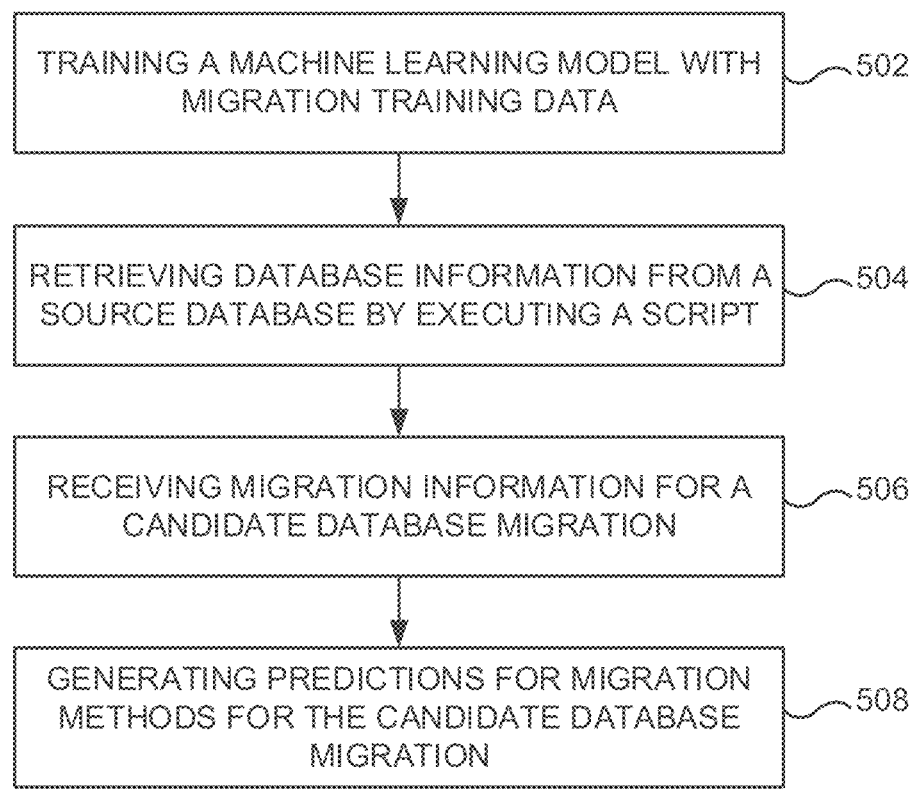
FIG. 5 illustrates a flow diagram for generating machine learning predictions for database migrations according to an example embodiment.

FIG. 5 illustrates a flow diagram for generating machine learning predictions for database migrations according to an example embodiment. In one embodiment, the functionality of FIG. 5 (and FIG. 6 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 502, a machine learning model can be trained using training data, where the training data includes migration information for a plurality of database migrations and migration methods for the plurality of database migrations, and the migration information includes a source database type and a target database infrastructure. For example, the machine learning model can include a neural network, a random forest classifier, a boosted gradient algorithm, a form of regression, or any other suitable machine learning model. The machine learning model can use an ensemble form of learning that aggregates predictions from a plurality of machine learning components.

In some embodiments, the training data includes instances of migration information for a given database migration and migration methods for the given database migration, the migration methods being labels for the training data. The migration methods can include one or more of database replication, pluggable database implementation, disaster recovery switchover, database cloning, and data pump conventional export and import. In some embodiments, the migration information for the database migrations from the training data include source database size, bandwidth criteria, and downtime criteria.

At 504, a script can be executed on a computing device that implements the source database to generate database migration information for a candidate database migration. For example, a script configured to retrieve source migration information from a source system (e.g., computing device that hosts the source database) can be downloaded and executed on the source system.

At 506, migration information for the candidate database migration can be received. For example, the migration information can be generated by the executed script. In some embodiments, migration information can be entered by a user (e.g., on a web page, progressive web application, or while executing the script) or uploaded by the user. In some embodiments, the migration information is generated both by executing the script to retrieve source system information and manual input by a user.

In some embodiments, the received migration information can be translated to a machine readable form (e.g., binary or hexadecimal). For example, a predetermined translation technique can be used to generate a machine readable version of the received migration information. In some embodiments, the migration information for the candidate database migration can be translated to a machine readable format, where the migration information can be mapped to machine readable format data using predetermined mappings based on closed lists of data values for the migration information.

At 508, migration methods for the candidate database migration can be predicted using the trained machine learning model based on the migration information. For example, the machine learning model can be trained to learn trends within a dataset of instances of training data, where the instances associate migration information to migration methods. Based on these learned trends, the trained machine learning model can predict migration methods for the candidate database migration using the received migration information. In some embodiments, the trained machine learning model is fed the translated migration information, or machine readable version (e.g., binary) of the migration information, to generate the predictions.

In some embodiments, the machine learning model includes an ensemble machine learning model that aggregates a plurality of predictions from a set trained machine learning models. For example, the migration information includes a set of migration features, the set of migration features can be split into a plurality of subsets of migration features, and the set of trained machine learning models are configured to receive the subsets of migration features and generate the plurality of predictions. In some embodiments, the set of machine learning models are configured to receive different sets of the migration features to generate predictions.

Figure 6:
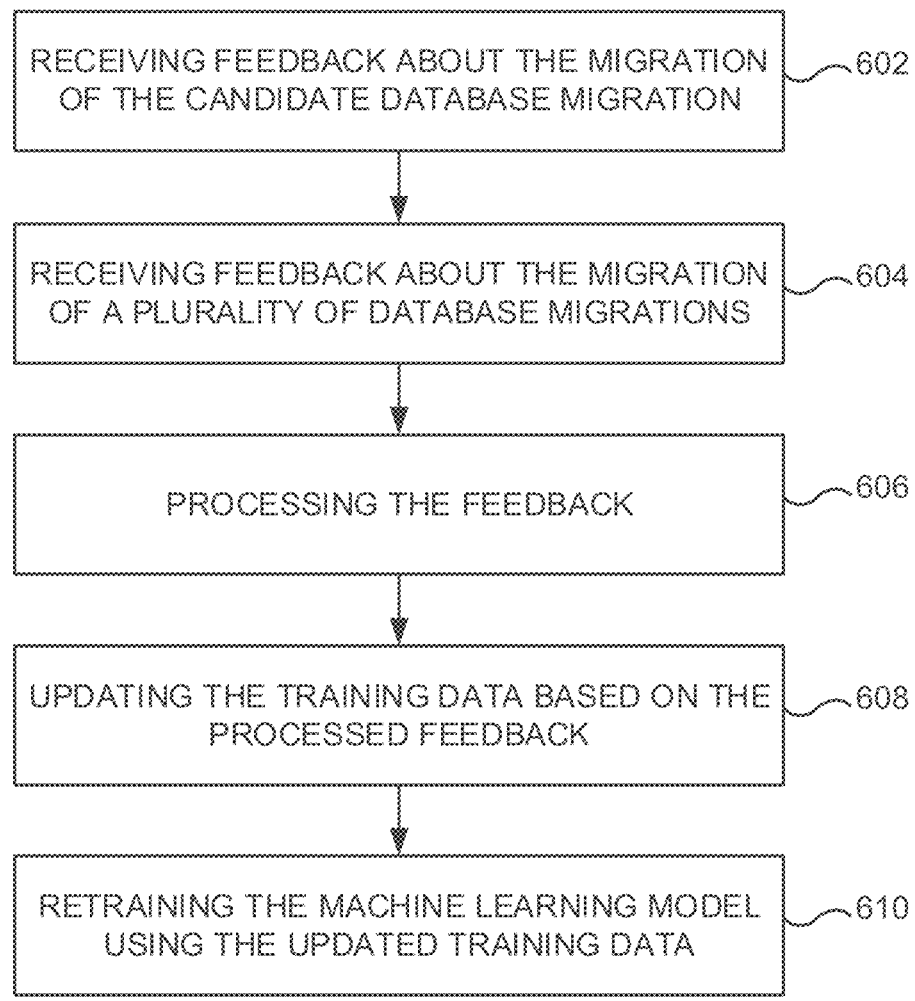
FIG. 6 illustrates a flow diagram for receiving feedback to improve a machine learning model according to an example embodiment.

FIG. 6 illustrates a flow diagram for receiving feedback to improve a machine learning model according to an example embodiment. At 602, feedback information including migration results associated with the predicted migration methods for the candidate database migration is received. The feedback information can include results of the migration (e.g., duration of time, downtime, compliance with downtime criteria, compliance with duration of time criteria, work hours, and the like) and the migration methods or techniques used to accomplish the candidate migration. For example, the feedback can reflect that the predicted migration methods were implemented and report whether the constraints for the migration were met by the predicted migration methods. In some embodiments, the feedback can indicate that the predicted migration methods performed well from a timing and computing resource perspective, but were too costly for the circumstances of the migration. In some embodiments, the feedback may indicate that a predicted migration method was substituted for another migration method based on a human expert's analysis that the predicted migration method would not perform well.

At 604, feedback information about a plurality of migrations using various migration methods can be received over time. For example, the feedback can include the migration information for the migrations and the migration methods used to implement the migrations. In some embodiments, the feedback information indicates whether the migration methods used were successful. The feedback for the plurality of migrations can be similar to the feedback for the candidate database migration.

At 606, the feedback information for the candidate database migration can be processed to generate an instance of training data. For example, when the feedback information for the candidate database migration indicates that it met migration criteria (e.g., downtime criteria, duration of time criteria, work hours criteria), the migration methods can be deemed a success for the migration information corresponding to the candidate database migration. Accordingly, the migration information and migration methods for the candidate database migration can be processed to generate an instance of training data.

In some embodiments, a plurality of the feedback for the database migrations can be processed. For example, where feedback indicates compliance with migration criteria for a set of migrations, the migration information and migration methods for migrations within the set can be processed to generate instances of training data. In some embodiments, when feedback is provided that indicates a migration did not meet the migration criteria, an instance of training data is not added.

At 608, the training data can be updated with the instances of training data generated using the processed feedback. At 610, the machine learning model can be retrained using the updated training data.

Embodiments predict migration techniques for database migrations using a trained machine learning model. For example, database migrations, such as migrations from on-premise computing devices to a cloud computing system, can be implemented using a number of different techniques and combinations of techniques, such as database replication, cloning, pluggable database implementations, and other techniques. Based on the circumstances for a migration, such as source database implementation/type, target database infrastructure, downtime criteria, bandwidth criteria, and other circumstances, some of these database migration techniques can be more effective than others. For example, often an expert may select the migration techniques based on experience.

Embodiments use a trained machine learning model to predict database migration techniques based on the circumstances for a given migration. For example, training data can include information for database migrations and techniques used to implement the migrations (e.g., techniques considered successful given the circumstances for the migrations). This training data can be used to train the machine learning model, where the training can configure the model to learn trends in the data. As such, the trained model can be effective at predicting migration techniques that will be effective given a set of circumstances for a database migration. In other words, a candidate database migration can be fed to the trained machine learning model, and predictions for migration techniques can be generated based on the learned trends within the training data.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for generating machine learning predictions for database migrations, the method comprising:

storing an ensemble machine learning model comprising a set of trained machine learning models configured to predict database migration methods using database migration information, wherein a plurality of parameters of the set of trained machine learning models are trained using training data comprising a plurality of training instances that includes migration information and one or more migration method labels, and the migration information of the training instances includes a source database type and a target database infrastructure;

receiving migration information for a candidate database migration that includes a source database type and a target database infrastructure; and predicting, using the set of trained machine learning models, migration methods based on the migration information for the candidate database migration, wherein the predicting comprises performing calculations by applying, using a computer processor, the trained plurality of parameters of the set of trained machine learning models to the migration information for the candidate database migration to generate the predicted migration methods, wherein updated training data is generated and used to retrain the ensemble machine learning model, and the updated training data is generated using previous migration method predictions and feedback indicative of results for the previous migration method predictions.

2. The method of claim 1, wherein the migration methods include one or more of database replication, pluggable database implementation, disaster recovery switchover, database cloning, and data pump conventional export and import.

3. The method of claim 1, wherein the candidate database migration information is generated by a script that is executed on a computing device that implements the source database.

4. The method of claim 1, wherein the migration information of the training instances and the migration information for the candidate database migration comprise source database size, bandwidth criteria, and downtime criteria.

5. The method of claim 1, further comprising: receiving feedback information comprising migration results associated with the predicted migration methods for the candidate database migration; processing the feedback information to generate a training instance of the updated training data; and retraining the ensemble machine learning model using the updating training data.

6. The method of claim 1, wherein the migration information of the training instances comprises a set of migration features, the set of migration features is split into a plurality of subsets of migration features, and each machine learning model of the set of machine learning models is trained using training instances that correspond to one of the subsets of the migration features.

7. The method of claim 6, wherein the migration information for the candidate database migration is organized according to the set of migration features, and the set of machine learning models are configured to receive different subsets of the migration features of the candidate database migration to generate the migration method predictions.

8. The method of claim 1, further comprising:
translating the candidate database migration information to a machine readable format, wherein the candidate database migration information is mapped to machine readable format data using predetermined mappings based on data values for the candidate database migration information; and
predicting, using the set of trained machine learning models, migration methods for the candidate database migration based on the translated candidate database migration information, wherein the predicting comprises applying, by a computer processor, the trained plurality of parameters of the set of trained machine learning models to the translated candidate database migration information for the candidate database migration to generate the predicted migration methods.

9. The method of claim 1, wherein the predicted migration methods are generated by aggregating individual predictions from the set of trained machine learning models.

10. A non-transitory computer readable medium having instructions stored thereon that, when executed by a processor, cause the processor to generate machine learning predictions for database migrations, wherein, when executed, the instructions cause the processor to:
store an ensemble machine learning model comprising a set of trained machine learning models configured to predict database migration methods using database migration information, wherein a plurality of parameters of the set of trained machine learning models are trained using training data comprising a plurality of training instances that includes migration information and one or more migration method labels, and the migration information of the training instances includes a source database type and a target database infrastructure;
receive migration information for a candidate database migration that includes a source database type and a target database infrastructure; and
predict, using the set of trained machine learning models, migration methods based on the migration information for the candidate database migration, wherein the predicting comprises performing calculations by applying the trained plurality of parameters of the set of trained machine learning models to the migration information for the candidate database migration to generate the predicted migration methods,
wherein updated training data is generated and used to retrain the ensemble machine learning model, and the updated training data is generated using previous migration method predictions and feedback indicative of results for the previous migration method predictions.

11. The computer readable medium of claim 10, wherein the migration methods include one or more of database replication, pluggable database implementation, disaster recovery switchover, database cloning, and data pump conventional export and import.

12. The computer readable medium of claim 10, wherein the candidate database migration information is generated by a script that is executed on a computing device that implements a source database.

13. The computer readable medium of claim 10, wherein when executed, the instructions cause the processor to:
receive feedback information comprising migration results associated with the predicted migration methods for the candidate database migration;
process the feedback information to generate a training instance of the updated training data; and
retrain the ensemble machine learning model using the updating training data.

14. The computer readable medium of claim 10, wherein the migration information of the training instances comprises a set of migration features, the set of migration features is split into a plurality of subsets of migration features, and each machine learning model of the set of machine learning models is trained using training instances that correspond to one of the subsets of the migration features.

15. The computer readable medium of claim 14, wherein the migration information for the candidate database migration is organized according to the set of migration features, and the set of machine learning models are configured to receive different subsets of the migration features of the candidate database migration to generate the migration method predictions.

16. The computer readable medium of claim 10, further comprising:
translating the candidate database migration information to a machine readable format, wherein the candidate database migration information is mapped to machine readable format data using predetermined mappings based on data values for the candidate database migration information; and predicting, using the set of trained machine learning models, migration methods for the candidate database migration based on the translated candidate database migration information, wherein the predicting comprises applying, by a computer processor, the trained plurality of parameters of the set of trained machine learning models to the translated candidate database migration information for the candidate database migration to generate the predicted migration methods.

17. The computer readable medium of claim 10, wherein the predicted migration methods are generated by aggregating individual predictions from the set of trained machine learning models.

18. A system for generating machine learning predictions for database migrations, the system comprising:
   a processor; and
   a memory storing instructions for execution by the processor, the instructions configuring the processor to:
   store an ensemble machine learning model comprising a set of trained machine learning models configured to predict database migration methods using database migration information, wherein a plurality of parameters of the set of trained machine learning models are trained using training data comprising a plurality of training instances that includes migration information and one or more migration method labels, and the migration information of the training instances includes a source database type and a target database infrastructure;
   receive migration information for a candidate database migration that includes a source database type and a target database infrastructure; and
   predict, using the set of trained machine learning models, migration methods based on the migration information for the candidate database migration, wherein the predicting comprises performing calculations by applying the trained plurality of parameters of the set of trained machine learning models to the migration information for the candidate database migration to generate the predicted migration methods,
   wherein updated training data is generated and used to retrain the ensemble machine learning model, and the updated training data is generated using previous migration method predictions and feedback indicative of results for the previous migration method predictions.

19. The system of claim 18, wherein the predicted migration methods are generated by aggregating individual predictions from the set of trained machine learning models.

20. The system of claim 18, wherein the migration information of the training instances comprises a set of migration features, the set of migration features is split into a plurality of subsets of migration features, and each machine learning model of the set of machine learning models is trained using training instances that correspond to one of the subsets of the migration features.

* * * * *